United States Patent
Mikhail

(10) Patent No.: US 11,055,746 B1
(45) Date of Patent: Jul. 6, 2021

(54) PERSONALIZED STYLE ADVICE AND SALES SYSTEM AND PROCESSES FOR OBTAINING PERSONALIZED STYLE ADVICE

(71) Applicant: Asbasia Aboelkhair Mikhail, Beverly Hills, CA (US)

(72) Inventor: Asbasia Aboelkhair Mikhail, Beverly Hills, CA (US)

( * ) Notice: Subject to any disclaimer, the term of this patent is extended or adjusted under 35 U.S.C. 154(b) by 270 days.

(21) Appl. No.: 15/872,765

(22) Filed: Jan. 16, 2018

Related U.S. Application Data

(60) Provisional application No. 62/446,619, filed on Jan. 16, 2017.

(51) Int. Cl.
*G06Q 30/06* (2012.01)
*G06Q 30/02* (2012.01)

(52) U.S. Cl.
CPC ..... *G06Q 30/0271* (2013.01); *G06Q 30/0277* (2013.01); *G06Q 30/0631* (2013.01); *G06Q 30/0643* (2013.01)

(58) Field of Classification Search
CPC ........... G06Q 30/0271; G06Q 30/0277; G06Q 30/0631; G06Q 30/0643
USPC .............................. 705/26.1, 26.7, 27.1, 27.2
See application file for complete search history.

(56) References Cited

U.S. PATENT DOCUMENTS

| | | | | |
|---|---|---|---|---|
| 8,615,448 B1 * | 12/2013 | O'Twomney | ...... | G06Q 30/0641 705/26.44 |
| 2003/0076318 A1 * | 4/2003 | Shaw-Weeks | ...... | A41H 1/00 345/419 |
| 2004/0078301 A1 * | 4/2004 | Illsley | ...... | G06Q 30/02 705/26.64 |
| 2006/0031081 A1 * | 2/2006 | Arne | ...... | G06Q 30/02 705/1.1 |
| 2013/0198039 A1 * | 8/2013 | Sridharan | ...... | G06Q 30/016 705/26.44 |

(Continued)

OTHER PUBLICATIONS

C. Cheng and D. S. Liu, "Discovering Dressing Knowledge for an Intelligent Dressing Advising System," Fourth International Conference on Fuzzy Systems and Knowledge Discovery (FSKD 2007), Haikou, 2007, pp. 339-343, doi: 10.1109/FSKD.2007.256. (Year: 2007).*

(Continued)

*Primary Examiner* — Michelle T Kringen
(74) *Attorney, Agent, or Firm* — Plager Schack LLP; Mark H. Plager; Stephen Hallberg

(57) ABSTRACT

An online personalized style advice and sales system for a consumer to contact a personal stylist to find articles of clothing that match an existing article of clothing and processes for obtaining personalized style advice are disclosed. The system includes a website that allows for consumers to contact a personal stylist in order to find perfect or near perfect article of clothing that would match an article of clothing that the consumer already owns or possesses. The consumer sends in a picture of themselves wearing the article of clothing they would like to match and the stylist would then do the search and find choices for the consumer to choose from. The consumer can choose to buy or not. The consumer will have the option to buy or not buy the chosen article of clothing that is picked out for them.

11 Claims, 6 Drawing Sheets

(56) References Cited

U.S. PATENT DOCUMENTS

| | | | | |
|---|---|---|---|---|
| 2014/0180873 A1* | 6/2014 | Rijhwani | ........... | G06Q 30/0623 |
| | | | | 705/26.61 |
| 2015/0058083 A1* | 2/2015 | Herrero | .............. | G06Q 30/0643 |
| | | | | 705/7.32 |
| 2016/0042402 A1* | 2/2016 | Gadre | ................ | G06Q 30/0276 |
| | | | | 705/14.66 |

OTHER PUBLICATIONS

Kamanec, Kara, "8 Online Subscription Services That Shop For You" Oct. 5, 2013 https://www.pcmag.com/news/8-online-subscription-services-that-shop-for-you (Year: 2013).*

Kessler, Sara, "4 Online Platforms for Personalized Style Advice" Jan. 10, 2011 https://mashable.com/2011/01/10/fashion-advice-sites/ (Year: 2011).*

* cited by examiner

PERSONALIZED STYLE ADVICE AND SALES SYSTEM AND PROCESSES FOR OBTAINING PERSONALIZED STYLE ADVICE

CLAIM OF BENEFIT TO PRIOR APPLICATION

This application claims benefit to U.S. Provisional Patent Application 62/446,619, entitled "CLOUD-BASED PERSONAL STYLIST SYSTEM," filed Jan. 16, 2017. The U.S. Provisional Patent Application 62/446,619 is incorporated herein by reference.

BACKGROUND

Embodiments of the invention described in this specification relate generally to personal stylist systems, and more particularly, to a process for obtaining personalized style advice and an online personalized style advice and sales system that allows an individual to contact a personal stylist in order to find an undetermined article of clothing that would match an existing article of clothing that the client already is in possession of or owns.

Many people borrow or own an article of clothing that is perfectly suited to their personal tastes and objectively complements their innate appearance, but are often unable to identify matching articles to complete an outfit. For instance, a perfect shirt for an individual can be enhanced by matching pants and shoes, but unmatched pants or shoes may detract from the impression the individual expects to project when wearing the shirt. Some individuals have this problem only occasionally while other individuals have this problem repeatedly. Whatever an individual's level of trouble is in not being able to find the perfect match for their uncompleted outfit, the troubles are typically not easy to personally solve, either because the individual lacks enough time to find matching items or the individual lacks a sufficient sense of style to complete the outfit (or both).

When individuals encounter such problems they typically resort to an unsatisfactory solution. For instance, some individuals solicit opinions and advice of friends or family. However, many friends and family members have stylistic deficiencies of their own, or only provide advice or opinions based on a limited view of style that works for their own person, but which may not be suitable to an individual presently having trouble identifying matching items. Other individuals simply accept their fate and repeatedly mismatch clothing items. Still others avoid the effort altogether, simply deciding not to bother with matching other clothing items and not purchasing or wearing (if already owned) the perfect clothing item in the first place.

Therefore, what is needed is a way to allow for individuals to contact a personal stylist in order to find an undetermined article of clothing that would match an existing article of clothing that the client already is in possession of or owns.

BRIEF DESCRIPTION

Some embodiments of the invention include a personalized style advice and sales system that allows an individual to contact a personal stylist in order to find a new article of clothing that would match an existing article of clothing that the individual already is in possession of or owns and processes for obtaining personalized style advice. The processes for obtaining personalized style advice include a high level process for obtaining personalized style advice, a detailed consumer process for obtaining personalized style advice, and a detailed server-side video-enabled process for obtaining online personalized style advice.

In some embodiments, the personalized style advice and sales system is an online personalized style advice and sales system comprising a cloud-network server that hosts personalized style advice and sales cloud service on a web portal. In some embodiments, the online personalized style advice and sales system allows individuals to contact a personal stylist in order to find the perfect article of clothing that would match an article of clothing that the client already is in possession of or owns. In some embodiments, an individual would capture a digital self-image while wearing the article of clothing to match against. In some embodiments, an individual would complete a survey describing certain details and aspects of themselves. In some embodiments, the individual would transmit the digital self-image to the online personalized style advice and sales system. In some embodiments, the individual would complete the survey when connected to the personalized style advice and sales cloud service on the web portal. In some embodiments, the individual would transmit the survey along with the digital self-image to the online personalized style advice and sales system. In some embodiments, the online personalized style advice and sales system allows the individual to review profiles and background information about several stylists and select a stylist from among the several stylists. In some embodiments, the online personalized style advice and sales system sends the digital self-image and the survey to the stylist selected by the individual. In some embodiments, the online personalized style advice and sales system sends the digital self-image and the survey to a stylist selected by the system. In some embodiments, the stylist researches possible matching clothing articles based on the digital self-image and provides a set of clothing article options to the individual. In some embodiments, the online personalized style advice and sales system communicably connects the individual to the stylist. In some embodiments, the communication connection allows the individual to ask the stylist questions about the clothing article options and allows the stylist to explain the clothing article options to the individual. In some embodiments, the online personalized style advice and sales system allows the individual to make a purchase decision about the clothing article options. In some embodiments, the purchase decision comprises a selection of purchasing one or more of the clothing article options and declining to purchase any of the clothing article options.

In some embodiments, the high level process for obtaining personalized style advice includes steps for providing personal style information of a consumer to a stylist, providing a photo of the consumer wearing an existing article of clothing to the stylist, presenting a recommended article of clothing that the stylist identified as matching the existing article of clothing, and presenting an incentive for the consumer to purchase the recommended article of clothing through the stylist.

In some embodiments, the detailed consumer process for obtaining personalized style advice includes steps for a consumer to (i) sign up for a personal stylist advice and sales membership, (ii) select a membership type as a pay-per-consult membership or a yearly membership, (iii) fill out a detailed personal style survey to provide subjective style input that supplements a stylist's effort to identify personal style matching items for the consumer, (iv) choose a particular personal stylist from a plurality of stylists, (v) send a photo to the particular personal stylist with an image of the consumer wearing an existing article of clothing to which to match one or more undetermined articles of clothing, (vi)

view one or more recommended articles of clothing that the particular personal stylist identified as matching the existing article of clothing, (vii) decide whether to purchase each recommended article of clothing through the particular personal stylist, and (viii) receive a purchase price discount for each recommended article of clothing purchase made by the consumer through the particular personal stylist.

In some embodiments, the detailed server-side video-enabled process for obtaining online personalized style advice includes steps for (i) receiving registration information of a consumer to sign up for a personal stylist advice and sales membership, (ii) receiving a membership selection of a pay-per-consult membership or a yearly membership, (iii) receiving subjective consumer style input in a detailed personal style survey to supplement a stylist's effort to identify personal style matching items for the consumer, (iv) identifying a plurality of stylists based on the subjective consumer style input in the detailed personal style survey, (v) presenting the plurality of stylists to the consumer for the consumer to review and select, (vi) receiving a selection by the consumer of a particular personal stylist from the plurality of stylists, (vii) receiving a photo with an image of the consumer wearing an existing article of clothing to which to match one or more undetermined articles of clothing, (viii) transmitting the photo with the image of the consumer wearing the existing article of clothing to the particular personal stylist, (ix) determining whether the consumer and the particular personal stylist want to video chat, (x) starting a video chat session between a consumer computing device used by the consumer and a stylist computing device used by the particular personal stylist when the consumer and the particular personal stylist want to video chat, (xi) receiving one or more recommended articles of clothing from the particular personal stylist that the particular personal stylist identified as matching the existing article of clothing, (xii) presenting, to the consumer, each recommended article of clothing and an option to purchase the recommended article of clothing through the particular personal stylist, and (xiii) providing a purchase price discount for each recommended article of clothing purchase made by the consumer through the particular personal stylist.

In some embodiments, a registered consumer can save membership account settings to quickly access the personalized style advice and sales system to obtain personal stylist advice. In some embodiments, the membership account settings include a preferred personal stylist which the registered consumer can set to any particular personal stylist of their choice. In this way, the steps for registering for a membership and selecting a personal stylist can be skipped for previously registered consumers who have set the preferred personal stylist in their membership account settings. In some embodiments, when a preferred personal stylist is set in the membership account settings of a previously registered consumer, an option is provided for the consumer to engage in an immediate consultation with the preferred personal stylist. In some embodiments, the immediate consultation with the preferred personal stylist comprises one or both of an on-the-spot video chat conference and an immediate text messaging conference. For instance, if a previously registered consumer with a preferred personal stylist happens to be out shopping and finds a desired article of clothing, the consumer may engage in an immediate consultation with the preferred personal stylist to obtain style advice on what to match with the desired article of clothing or even a critique of the desired article of clothing itself. In some embodiments, a previously registered consumer may also engage in an immediate consultation when the preferred personal stylist cannot be reached or cannot communicate at the present moment. In some embodiments, the option to engage in the immediate consultation then presents several stylists for the consumer to choose from to engage in the immediate style advice consultation.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
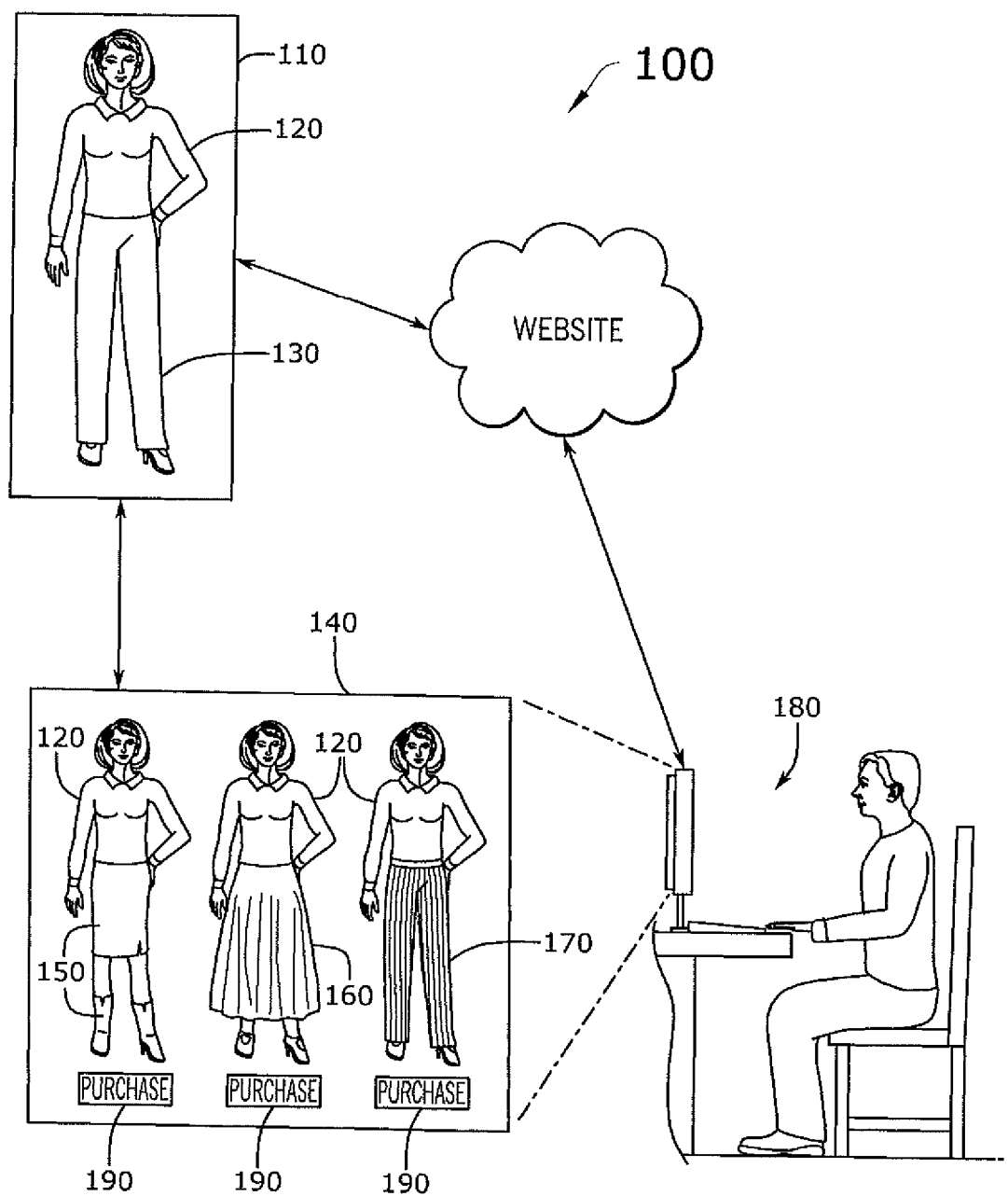

Having thus described the invention in general terms, reference is now made to the accompanying drawings, which are not necessarily drawn to scale, and which show different views of different example embodiments, and wherein:

FIG. 1 conceptually illustrates an online personalized style advice and sales system in some embodiments.

Figure 2:
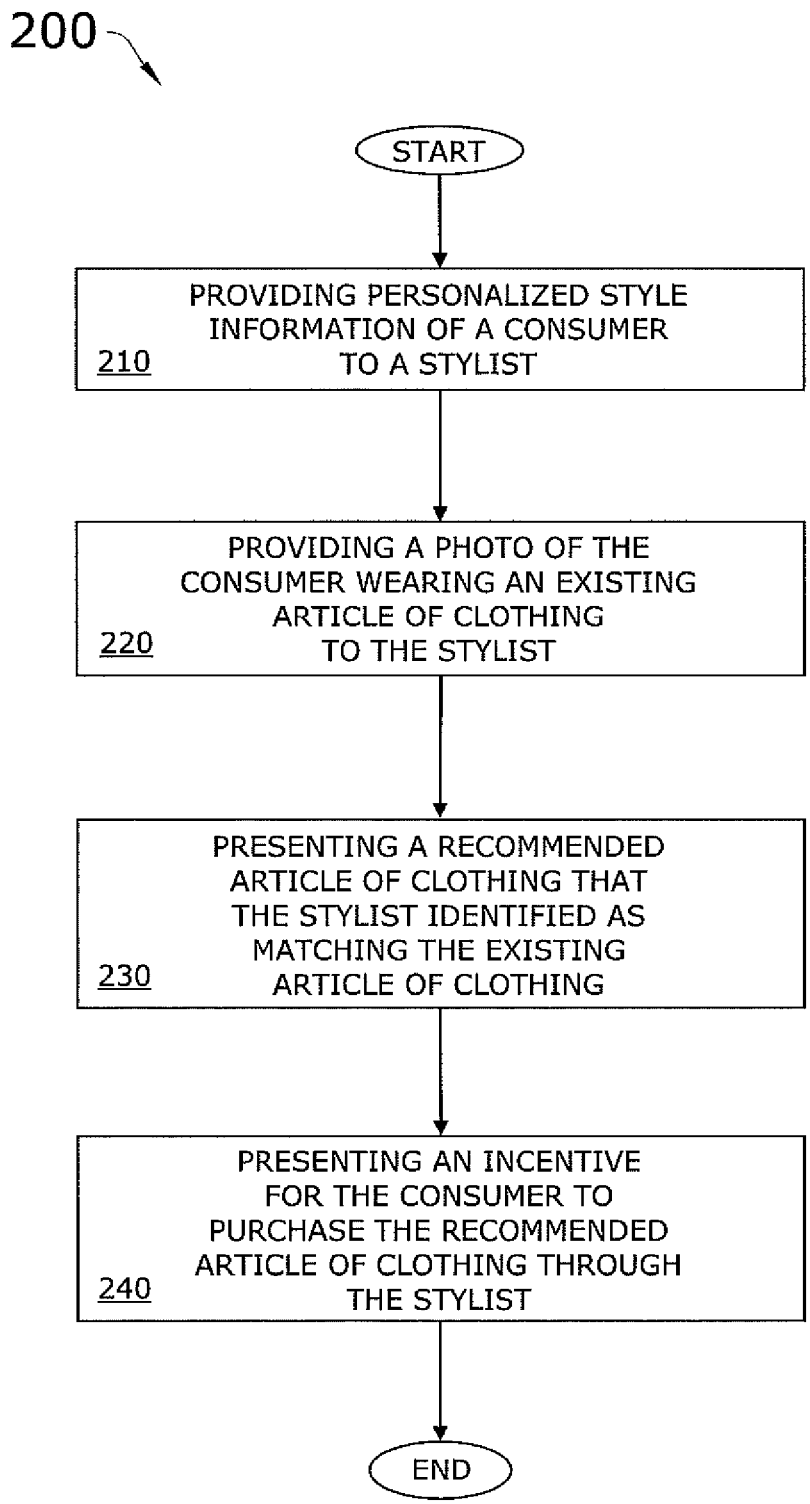

FIG. 2 conceptually illustrates a high level process for obtaining personalized style advice in some embodiments.

Figure 3:
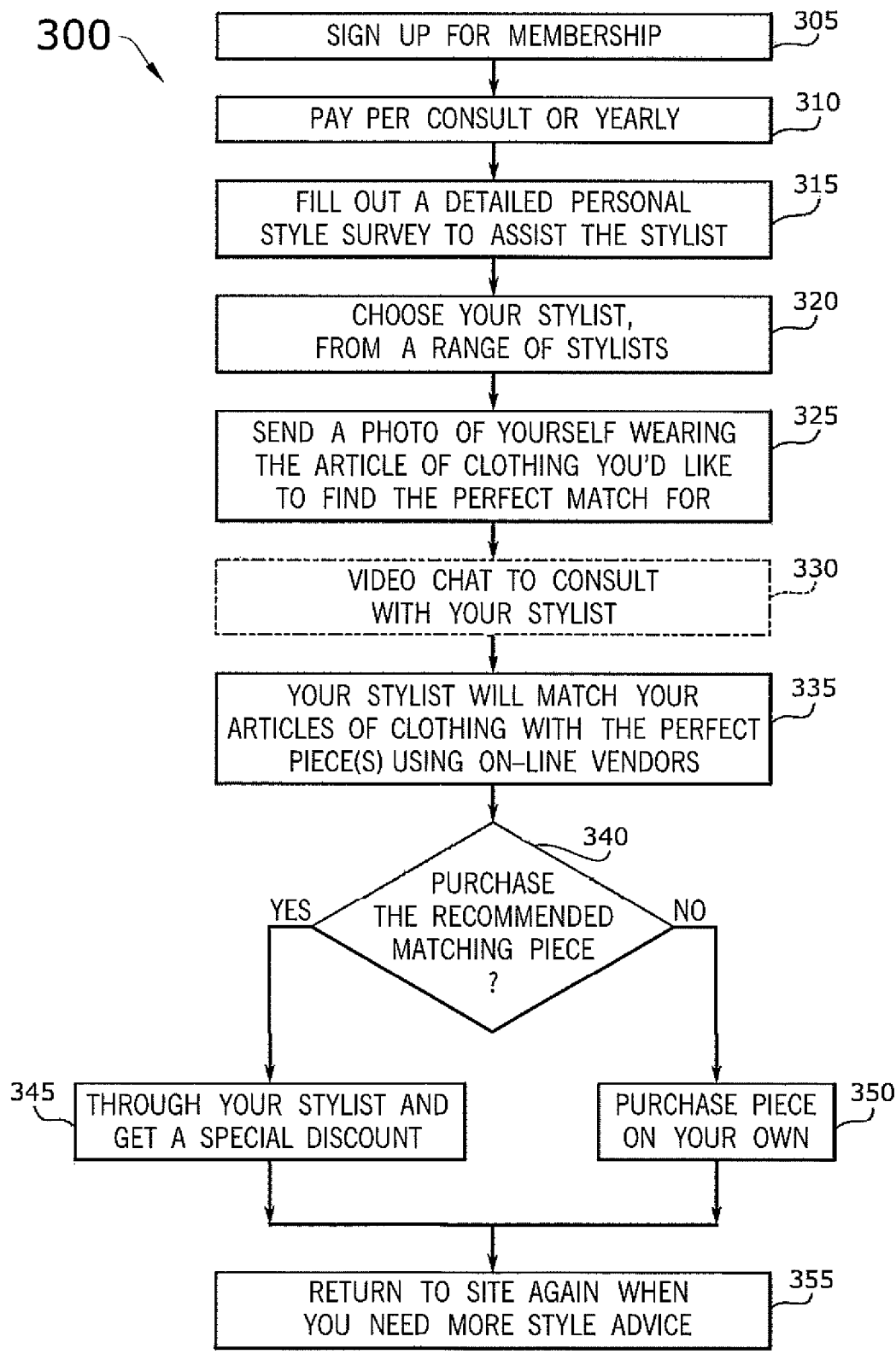

FIG. 3 conceptually illustrates a detailed consumer process for obtaining personalized style advice in some embodiments.

Figure 4:
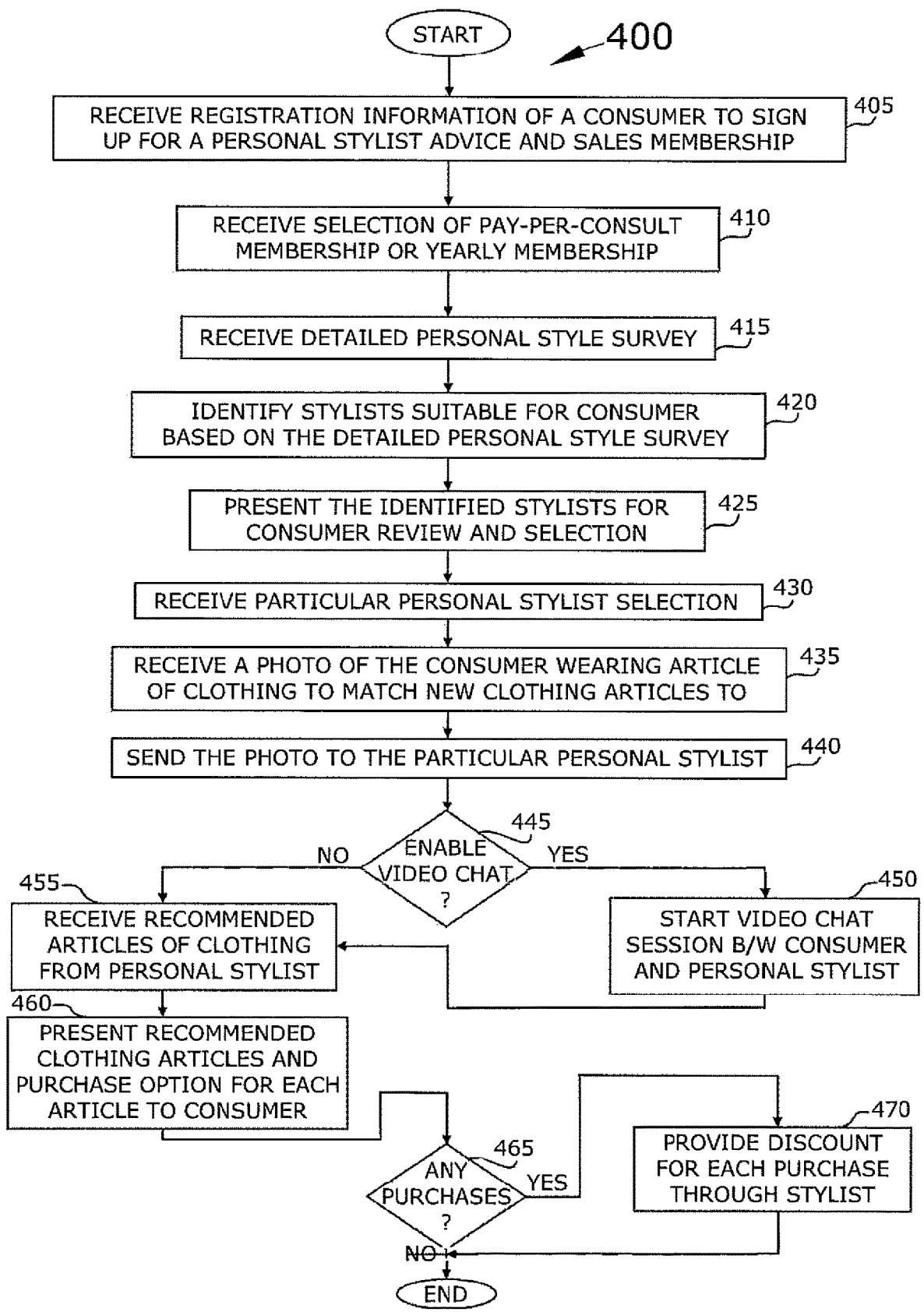

FIG. 4 conceptually illustrates a detailed server-side video-enabled process for obtaining online personalized style advice in some embodiments.

Figure 5:
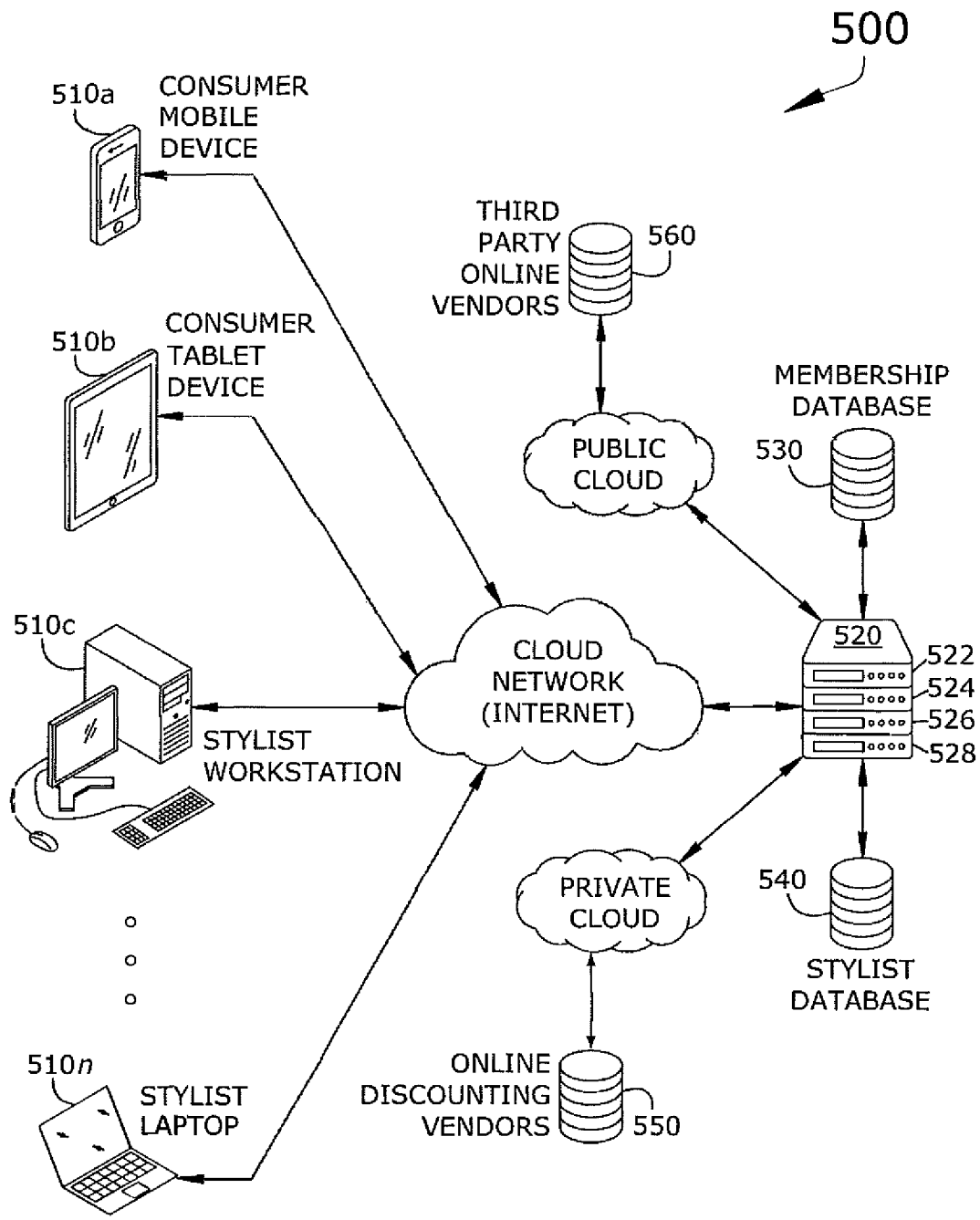

FIG. 5 conceptually illustrates an architecture of an online personalized style advice and sales system in some embodiments.

Figure 6:
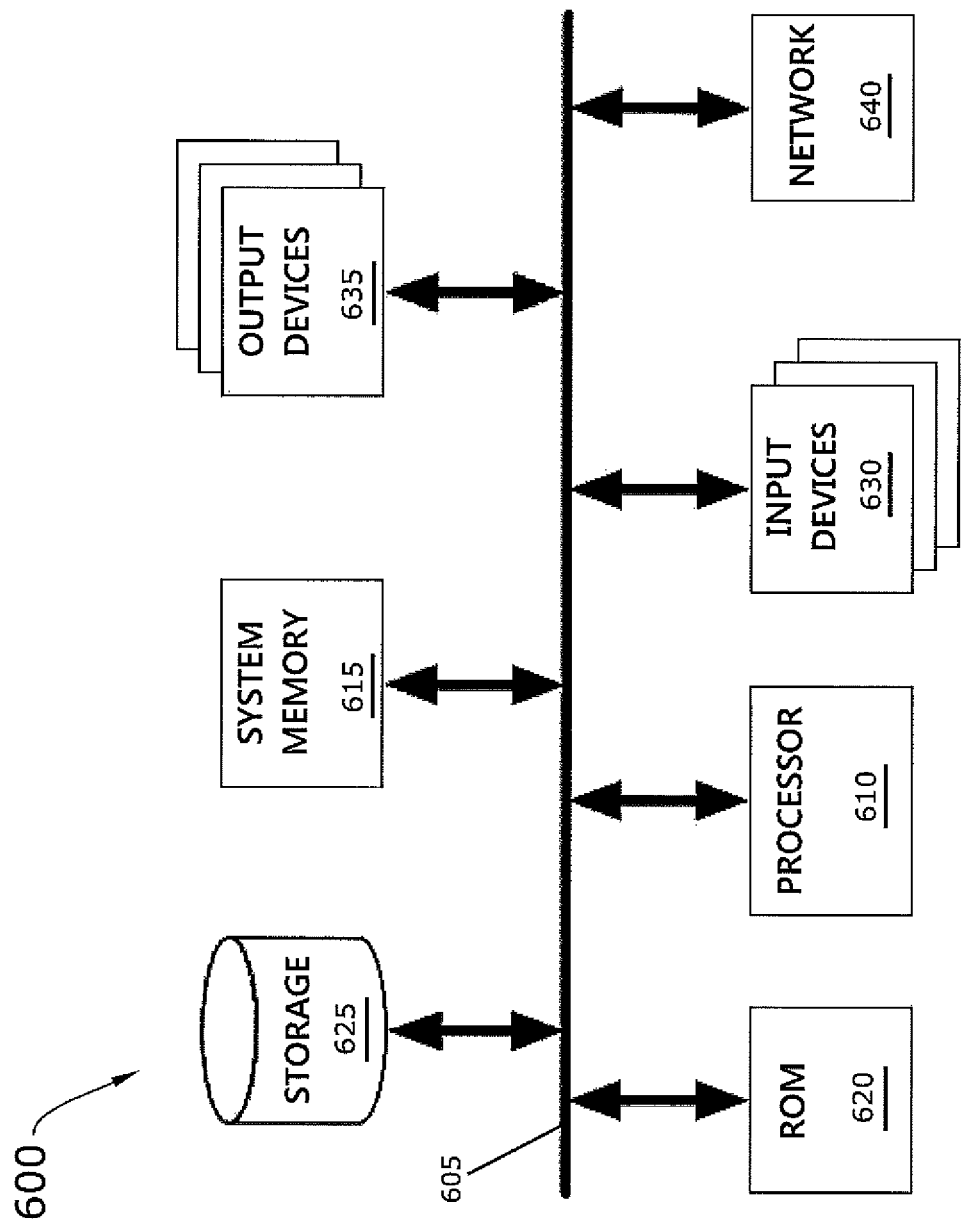

FIG. 6 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a personalized style advice and sales system that allows an individual to contact a personal stylist in order to find a new article of clothing that would match an existing article of clothing that the individual already is in possession of or owns and processes for obtaining personalized style advice. The processes for obtaining personalized style advice include a high level process for obtaining personalized style advice, a detailed consumer process for obtaining personalized style advice, and a detailed server-side video-enabled process for obtaining online personalized style advice.

As stated above, individuals often cannot find the perfect match for their uncompleted outfit either due to lack time, lack of style, or both. Embodiments of the invention described in this specification solve such problems by an online personalized style advice and sales system and processes for obtaining personalized style advice—including a high level process for obtaining personalized style advice, a detailed consumer process for obtaining personalized style advice, and a detailed server-side video-enabled process for obtaining online personalized style advice—which allow individuals to contact a personal stylist in order to find the perfect article of clothing that would match an article of clothing that the client already is in possession of or owns. The online personalized style advice and sales system and the processes for obtaining personalized style advice allow individuals to have direct contact with stylists who will do all the work and thinking for them, while the individuals do not even need to know the stylist and does not even need to leave their home, being an online web portal-based system to which an individual can connect at any hour as online shopping is available 24/7.

In some embodiments, the high level process for obtaining personalized style advice includes steps for providing personal style information of a consumer to a stylist, providing a photo of the consumer wearing an existing article of clothing to the stylist, presenting a recommended article of clothing that the stylist identified as matching the existing article of clothing, and presenting an incentive for the consumer to purchase the recommended article of clothing through the stylist.

In some embodiments, the detailed consumer process for obtaining personalized style advice includes steps for a consumer to (i) sign up for a personal stylist advice and sales membership, (ii) select a membership type as a pay-per-consult membership or a yearly membership, (iii) fill out a detailed personal style survey to provide subjective style input that supplements a stylist's effort to identify personal style matching items for the consumer, (iv) choose a particular personal stylist from a plurality of stylists, (v) send a photo to the particular personal stylist with an image of the consumer wearing an existing article of clothing to which to match one or more undetermined articles of clothing, (vi) view one or more recommended articles of clothing that the particular personal stylist identified as matching the existing article of clothing, (vii) decide whether to purchase each recommended article of clothing through the particular personal stylist, and (viii) receive a purchase price discount for each recommended article of clothing purchase made by the consumer through the particular personal stylist.

In some embodiments, the detailed server-side video-enabled process for obtaining online personalized style advice includes steps for (i) receiving registration information of a consumer to sign up for a personal stylist advice and sales membership, (ii) receiving a membership selection of a pay-per-consult membership or a yearly membership, (iii) receiving subjective consumer style input in a detailed personal style survey to supplement a stylist's effort to identify personal style matching items for the consumer, (iv) identifying a plurality of stylists based on the subjective consumer style input in the detailed personal style survey, (v) presenting the plurality of stylists to the consumer for the consumer to review and select, (vi) receiving a selection by the consumer of a particular personal stylist from the plurality of stylists, (vii) receiving a photo with an image of the consumer wearing an existing article of clothing to which to match one or more undetermined articles of clothing, (viii) transmitting the photo with the image of the consumer wearing the existing article of clothing to the particular personal stylist, (ix) determining whether the consumer and the particular personal stylist want to video chat, (x) starting a video chat session between a consumer computing device used by the consumer and a stylist computing device used by the particular personal stylist when the consumer and the particular personal stylist want to video chat, (xi) receiving one or more recommended articles of clothing from the particular personal stylist that the particular personal stylist identified as matching the existing article of clothing, (xii) presenting, to the consumer, each recommended article of clothing and an option to purchase the recommended article of clothing through the particular personal stylist, and (xiii) providing a purchase price discount for each recommended article of clothing purchase made by the consumer through the particular personal stylist.

By way of example, FIG. 1 conceptually illustrates an online personalized style advice and sales system 100. As shown in this figure, the online personalized style advice and sales system 100 includes an image of a consumer 110, a screenshot of proposed substitution garments 140, and a stylist workstation 180 at which a stylist identifies and recommends the proposed substitution garments.

The image of the consumer 110 is provided by a consumer who accesses a website hosted by a web server of the online personalized style advice and sales system 100. The image of the consumer 110 includes a garment to be matched 120 with substitute garments and a garment to be replaced 130. In addition, the consumer may provide subjective style preferences and other information in a survey that is filled out by the consumer at the website and provided to a stylist to provide additional criteria for selecting substitution garments.

The screenshot of proposed substitute garments 140 is generated by the online personalized style advice and sales system 100 in response to garment selections identified at the stylist workstation 180 and proposed to the consumer by the stylist. The screenshot of proposed substitute garments 140 includes multiple modified images of the consumer, each having the garment to be matched 120 and a substitute garment(s) in place of the garment to be replaced 130. Specifically, a first ensemble substitution suggestion 150 appears in place of the garment to be replaced 130 on a left-side modified image of the consumer in the screenshot of proposed substitute garments 140, a second substitution suggestion 160 appears in place of the garment to be replaced 130 on a middle modified image of the consumer in the screenshot of proposed substitute garments 140, and a third substitution suggestion 170 appears in place of the garment to be replaced 130 on a right-side modified image of the consumer in the screenshot of proposed substitute garments 140. While this example only displays a single screenshot of proposed substitute garments 140, the online personalized style advice and sales system 100 is able to generate as many views or screenshots of as many proposed substitute garments as needed or requested.

Regardless of the number of views or screenshots generated, the online personalized style advice and sales system 100 transmits the screenshot of proposed substitute garments 140 (as many as needed/requested) to the consumer. Each modified image of the consumer in the screenshot of proposed substitute garments 140 corresponds to an onscreen purchase button 190, which appears under the corresponding modified image of the consumer. By selecting the onscreen purchase button 190, the consumer can start a purchase transaction for the substitution garments appear on the corresponding modified image of the consumer.

Embodiments of the online personalized style advice and sales system described in this specification differ from and improve upon currently existing options. In particular, some embodiments of the online personalized style advice and sales system differ because other personal style sites that exist usually involve the stylist finding a complete outfit for an individual, rather than starting from some clothing article the individual provides to match against. Furthermore, existing options are not personalized in ways that allow an individual to send in their measurements. In contrast, the online personalized style advice and sales system of the present disclosure allows an individual to send a digital self-image in which the individual is wearing only a leotard so that the stylist really has a good idea of what their body type is like.

In addition, embodiments of the online personalized style advice and sales system improve upon the currently existing options because the online personalized style advice and sales system is more personalized and accounts for each individual's budget. Also, individuals are given several options to choose from prior to making a decision. Individuals will also be able to choose whether or not to buy the chosen article of clothing that is picked out for them. Therefore, the online personalized style advice and sales system allows for a diverse clientele as far as budget, and taste, yet empowers individuals in ways that do not lock them into enforced purchases. This is an improvement over other sites which, to date, have not been as successful due to a fundamental assumption that the customer will pay a certain amount of money (whether via purchase or other manner), and because the sites are not as personalized and do not work with what the individual already has.

The online personalized style advice and sales system of the present disclosure may include the following features. This list of possible constituent features is intended to be exemplary only and it is not intended that this list be used to limit the system of the present application to just these features. Persons having ordinary skill in the art relevant to the present disclosure may understand there to be equivalent features that may be substituted within the present disclosure without changing the essential function or operation of the online personalized style advice and sales system.

1. Cloud service (everything is done strictly online through browsers, apps, video chat, etc.)
2. Direct connection over the cloud which allows direct access to a personal stylist of the consumer's choice
3. Personalization options (e.g., detailed personal style survey) which render the system extremely personalized
4. Focused search in which the consumer can search for only one matching article of clothing (or sets/ensembles)
5. Time/budget options in which time is commensurate with a budget of the consumer
6. Consumer selection of personal stylist, in which there are a number of different stylists for the individual to choose from
7. No lock-in or compelled purchases which ensure that the consumer can choose not to buy in the end
8. Subscription model in which consumer pays for a subscription level for a certain number of consults/year or on a per-consult basis
9. Stylist purchase options in which the stylist, when requested by the consumer, can purchase the item desired and have it sent directly to the consumer The various features of the online personalized style advice and sales system of the present disclosure may be related in the following exemplary fashion. It is not intended to limit the scope or nature of the relationships between the various features and the following examples are presented as illustrative examples only. The individual using the system (e.g., the "user") will have to first set up an account and then fill out an on-line survey that will be used by the stylist. The user will also send a digital self-image while the user is wearing something similar to a leotard (not mandatory, but recommended). Once set up, the user will be able to access the system over the Internet via computing device connecting to a cloud server that hosts the web portal for the personal stylist communication and style matching system. When the user accesses the system, the user may book a consultation with a personal stylist. In some embodiments, the user selects a personal stylist from among several personal stylists. In some other embodiments, the system automatically identifies matching personal stylists who are qualified to assist the user, given the user profile information provided during sign-up. After a personal stylist is identified (manually or automatically), the user sends in a picture of the item they wish to match (preferably a digital self-image wearing the item and another digital image of the item on its own). Then the personal stylist does all the work while the user sits back and relaxes. Once they have completed their online search through different vendors, the personal stylist will send the user a few choices (2-3) that are within the user's budget. If the user is satisfied with the choices, the user can choose to purchase from the vendor themselves or the stylist may offer to purchase the item for the user and have it sent to their home or desired location.

The online personalized style advice and sales system of the present disclosure generally works by sequences of steps in which the individual signs in and fills out an online survey in order for a personal stylist to get a feel of what the individual might like. The individual would take or provide digital photos of themselves and of the article of clothing they are hoping to find a match for. The individual would then upload the photos onto the website. The individual may make certain requests (e.g., long sleeves, unwanted colors, fabrics to avoid, etc.). The personal stylist then does all the work. The stylist will then find several items which the individual might be interested in. The stylist will list the website for which on-line sites they can purchase their choice from. If the individual is not satisfied with the choices, the individual is not obligated to buy any of the selected items. If the individual is happy with the stylist's pick, the individual can then purchase the item. Either the individual or the stylist will be able to securely purchase the item based on user selection. The payment method can be any, but e.g., if a credit card is used, then the individual's credit card information is securely used for completing the purchase transaction and the item can be sent directly to the individual's billing address. If the individual wants to use this website, they must know how to be able to take digital photos and to upload them onto the website. If the individual has a personal style, they will need to find a stylist that is perfect fit for them. However, some individual's may choose to utilize the automatic stylist matching feature, in which a personal stylist is automatically selected based on information provided by the individual.

Several more detailed embodiments are described in the sections below. Section I describes several processes for obtaining personalized style advice. Section II describes a cloud-computing network architecture of an online personalized style advice and sales system. Section III describes an electronic system that implements some embodiments of the invention.

I. Processes for Obtaining Personalized Style Advice

The processes for obtaining personalized style advice include a high level process for obtaining personalized style advice, a detailed consumer process for obtaining personalized style advice, and a detailed server-side video-enabled process for obtaining online personalized style advice.

By way of example, FIG. 2 conceptually illustrates a high level process for obtaining personalized style advice 200. As shown in this figure, the high level process for obtaining personalized style advice 200 starts by providing (at 210) personalized style information of a consumer to a stylist. The personalized style information may include body measurements, body type selections, preferred colors, preferred patterns, expected environment(s) or usage(s) for the clothing, etc. After the personalized style information of the consumer is provided to the stylist, the high level process for obtaining personalized style advice 200 then provides (at 220) a photo to the stylist of the consumer wearing an existing article of clothing. The consumer may take a photo, for example, with a smartphone or a web camera. In some embodiments, the photo is taken in connection with a website that allows the consumer to approximate a suitable image that shows the consumer from head to toe, with at least one article of clothing for which the consumer wishes to find matching articles of clothing.

In some embodiments, the high level process for obtaining personalized style advice 200 next presents (at 230) a recommended article of clothing to the consumer, which is identified and recommended by the stylist and presented to the consumer on a screen of a computing device used by the consumer for review and possible purchase. In some embodiments, the high level process for obtaining personalized style advice 200 presents (at 240) an incentive for the consumer to purchase the recommended article of clothing through the stylist. For example, the incentive may be a discounted price which incentivizes the consumer to make the purchase through the stylist who identified and recommended the article of clothing. Then the high level process for obtaining personalized style advice 200 ends.

As the high level process for obtaining personalized style advice 200 shows, consumers can obtain personalized style advice and make purchases of articles of clothing which are identified as perfect or near perfect matches based on at least one existing article of clothing of the consumer (and other style information as provided by the consumer). In this way, the style advice can be completely personalized no matter where the stylist and consumer are situated.

Another process for obtaining personalized style advice is described by reference to FIG. 3, which conceptually illustrates a detailed consumer process for obtaining personalized style advice 300. As shown in this figure, the detailed consumer process for obtaining personalized style advice 300 starts when a consumer signs up for a membership (at 305) in connection with an online personalized style advice and sales system. The consumer then selects a membership option (at 310) to pay for each consultation piecemeal or to purchase a yearly membership. For example, the consumer may select an option for a yearly membership that includes twelve consultations (or some other number of consultations) with a personal stylist of their choice.

After membership is completed, the detailed consumer process for obtaining personalized style advice 300 moves to the next step at which the consumer fills out a detailed personal style survey to assist the stylist (at 315). The detailed personal style survey includes style information such as measurements and sizes, color and pattern preferences, etc. Next, the detailed consumer process for obtaining personalized style advice 300 proceeds with the consumer choosing (at 320) a stylist from a range of stylists. For example, the consumer may choose a stylist who they have consulted with in the past, or may view the profiles of multiple stylists and choose one who seems to be a good fit for the consumer's expected needs.

In some embodiments, the detailed consumer process for obtaining personalized style advice 300 transitions to the next step at which the consumer sends a photo (at 325) with the consumer wearing an article of clothing that the consumer would like to find a perfect match of another article of clothing. In some embodiments, the detailed consumer process for obtaining personalized style advice 300 includes an optional step to video chat (at 330). In some embodiments, the user and the personal stylist connect and communicate over a digital video stream that provides two-way video and audio (a "video chat"). The video chat is able to connect the consumer and the stylist of their choice over a private digital video stream session, thereby allowing the stylist to get a better idea of the consumer's needs. In some embodiments, the private digital video stream is encrypted to protect the privacy of the consumer. Also, by using a video chat to interact, the user may not need to send a digital self-image, so long as the personal stylist is able to sufficiently get an idea of the user's body type (and other pertinent features) through the video chat.

In some embodiments, after the stylist has received the photo and the personal style survey (and after any video chat, if any), then the stylist matches (at 335) the consumer's existing article of clothing with one or more new articles of clothing that are intended to be perfect or near perfect matches to the existing article of clothing, given the consumer's preferences. In some embodiments, the new articles of clothing recommended by the stylist are from online vendors and purchases can be made through the stylist or independently of the stylist (e.g., at the online vendor).

After presenting the new articles of clothing to the consumer, the consumer then decides for each new article of clothing recommended by the stylist (at 340) whether to purchase the recommended new article of clothing. When the consumer decides to purchase the new article of clothing, then the detailed consumer process for obtaining personalized style advice 300 proceeds to the next step at which the new article of clothing is purchased through the stylist who recommended the new article of clothing (at 345). In some embodiments, a special discount is applied (at 345) to the purchase of the new article of clothing when the consumer purchases through their personal stylist. On the other hand, when the consumer decides not to purchase the recommended new article of matching clothing (through the personal stylist), then the process for obtaining personalized style advice 300 continues to the next step (at 350) during which the consumer can purchase the recommended new article of matching clothing on their own (e.g., through the online vendor's site or at a physical location of the vendor, etc.), or alternatively, the consumer can simply decide not to purchase the recommended new article of matching clothing at all. After the consumer reviews all of the recommended new articles of matching clothing and decides whether or not to purchase any of the recommended new articles of matching clothing, then the process for obtaining personalized style advice 300 is over, although the consumer can return (at 355) to the site later when more style advice is needed.

The process for obtaining personalized style advice 300 described above is a consumer user-based process which is provided from the perspective of the consumer who is seeking style advice. However, the process for obtaining personalized style advice 300 is performed in connection with a cloud-based online personalized style advice and sales system in which there is a corresponding process representing a server perspective. The server-side process corresponding to the process for obtaining personalized style advice 300 is described next.

In particular, FIG. 4 conceptually illustrates a detailed server-side video-enabled process for obtaining online personalized style advice 400. As shown in this figure, the detailed server-side video-enabled process for obtaining online personalized style advice 400 starts by receiving (at 405) registration information for a consumer who is signing up for a personal style advice and sales membership on a cloud-based online personalized style advice and sales system in which there is a corresponding process representing a server perspective. Registration information for membership may include name, billing method, membership type, contact information (e.g., email, phone, video chat ID, etc.), and/or other information which may facilitate a consumer and/or a stylist in efforts to express style requests or style recommendations. Next, the detailed server-side video-enabled process for obtaining online personalized style advice 400 receives (at 410) selection of a membership level. In some embodiments, the membership level can be a pay-per-consult membership level in which the consumer pays piecemeal for each personalized style consultation engaged in by the consumer, or a yearly membership which includes either a number of paid consultations for a full year that are aggregated in bulk (e.g., 12 consults per year to use any time during the year, 24 consults per year to use any time during the year, etc.) or are allocated to time period units (e.g., 12 consults per year to use once per month, 52 consults per year to use once per week, 24 consults per year with 6 consults to be used at any time during any three month period of the year, etc.).

In some embodiments, the detailed server-side video-enabled process for obtaining online personalized style advice 400 next receives (at 415) a detailed personal style survey. The detailed personal style survey is completed by the consumer and is provided by the consumer at any time after the consumer has registered for an account and selected a membership level, but nonetheless provided before the consumer is able to identify any stylists or obtain any personal style advice from stylists. For example, the consumer may register, select a membership level, and immediately thereafter fill out and complete the detailed personal style survey, or the consumer may register and select a membership level, but wait several days or weeks to complete the detailed personal style survey.

In some embodiments, the detailed server-side video-enabled process for obtaining online personalized style advice 400 identifies (at 420) personal stylists suitable for the consumer based on information about the consumer and in part from the detailed personal style survey. In some embodiments, the detailed server-side video-enabled process for obtaining online personalized style advice 400 presents (at 425) the identified stylists for the consumer to review and make a stylist selection. Next, the detailed server-side video-enabled process for obtaining online personalized style advice 400 receives (at 430) a selection of a particular personal stylist. The particular personal stylist is selected by the consumer from the identified personal stylists presented to the consumer for review and selection.

After the consumer has selected the particular personal stylist, the detailed server-side video-enabled process for obtaining online personalized style advice 400 receives (at 435) a photo of the consumer wearing an article of clothing to provide to the particular personal stylist to use in identifying perfect or near perfect matches of new clothing articles. In some embodiments, the received photo is provided to the particular personal stylist and stored in connection with membership information about the consumer in a membership database. Thus, the detailed server-side video-enabled process for obtaining online personalized style advice 400 of some embodiments sends (at 440) or transmits the photo to the particular personal stylist.

In some embodiments, the detailed server-side video-enabled process for obtaining online personalized style advice 400 determines (at 445) whether to enable a video chat session between a consumer computing device of the consumer (e.g., consumer's smartphone) and a stylist computing device (e.g., a workstation used by the particular personal stylist). When a video chat session is wanted by both the consumer and the particular personal stylist, then the detailed server-side video-enabled process for obtaining online personalized style advice 400 starts a new video chat session (at 450) between the consumer and the particular personal stylist.

On the other hand, when a video chat session is not wanted or cannot be enabled (e.g., the consumer does not have a video camera or device with a suitable video capture device), then the detailed server-side video-enabled process for obtaining online personalized style advice 400 transitions to the next step (which is also the step after the video chat session is started) to receive (at 455) one or more recommended articles of clothing from the particular personal stylist. Upon receiving the recommended articles of clothing from the particular personal stylist, the detailed server-side video-enabled process for obtaining online personalized style advice 400 of some embodiments presents to the consumer (at 460) the recommended articles of clothing and a purchase option for each recommended article of clothing. For example, the recommended articles of clothing and the purchase option are visually output in screenshots to a display screen of a mobile device operated by the consumer, such as the screenshot of proposed substitute garments 140 and the onscreen purchase button 190 described above by reference to FIG. 1.

In some embodiments, the detailed server-side video-enabled process for obtaining online personalized style advice 400 determines (at 465) whether the consumer has selected the purchase option for any of the recommended articles of clothing. The detailed server-side video-enabled process for obtaining online personalized style advice 400 may wait for any amount of time for the consumer to make a selection. In some embodiments, the recommended articles of clothing are stored in a membership database in connection with the photo of the consumer wearing the article of clothing to match against and membership information associated with the consumer. However, the consumer can remove any or all of the recommended articles of clothing at any time. For example, the consumer may only like one article of clothing among several recommended articles of clothing, and may remove all of the recommended articles of clothing after making a purchase of the one like article of clothing. As such, when the consumer has selected the purchase option for a particular recommended article of clothing, the detailed server-side video-enabled process for obtaining online personalized style advice 400 provides (at 470) a special discount for purchasing the particular recommended article of clothing through the particular personal stylist. However, the consumer may also buy any of the recommended articles of clothing independently, in which case the special discount would not apply. Then the detailed server-side video-enabled process for obtaining online personalized style advice 400 ends.

In some embodiments, the detailed server-side video-enabled process for obtaining online personalized style advice 400 recognizes a previously registered consumer by login credentials and skips several steps associated with registration, membership, completion of the detailed personal style survey, and/or steps for selecting a personal stylist. In some embodiments, a previously registered consumer can save membership account settings, the detailed personal style survey, and other information (such as a preferred or default stylist) to quickly engage in a consultation with a stylist to obtain personal stylist advice. Thus, in some embodiments, the detailed server-side video-enabled process for obtaining online personalized style advice 400 skips the steps for receiving registration information (at 405), receiving a membership selection (at 410), receiving the detailed personal style survey (at 415), and identifying suitable stylists (at 420), and starts instead with a step for receiving login credentials from the consumer followed by a step for receiving an on-the-spot consultation selection and then transitions to the step for presenting identified stylists for the consumer to review and select (at 425). In addition, when a previously registered consumer has selected a preferred or default stylist, the detailed server-side video-enabled process for obtaining online personalized style advice 400 of some embodiments skips the steps for receiving registration information (at 405), receiving a membership selection (at 410), receiving the detailed personal style survey (at 415), identifying suitable stylists (at 420), presenting identified stylists for the consumer to review and select (at 425), and receiving a particular personal stylist selection (at 430), and starts instead with a step for receiving login credentials from the consumer followed by a step for receiving an on-the-spot consultation selection with the preferred or default stylist and then transitions to the step for receiving a photo of the consumer wearing an article of clothing to match (at 435).

In some embodiments, the on-the-spot consultation selection activates an immediate consultation with the preferred (or default) personal stylist. In some embodiments, the on-the-spot consultation comprises one or both of an on-the-spot video chat conference and an immediate text messaging conference. For instance, if a previously registered consumer with a preferred personal stylist happens to be out shopping and finds a desired article of clothing, the consumer may engage in an immediate consultation with the preferred personal stylist to obtain style advice on what to match with the desired article of clothing or even a critique of the desired article of clothing itself. In some embodiments, the detailed server-side video-enabled process for obtaining online personalized style advice 400 ensures that a previously registered consumer can engage in an on-the-spot consultation when the preferred personal stylist cannot be reached or cannot communicate immediately. In some embodiments, the detailed server-side video-enabled process for obtaining online personalized style advice 400 transitions back to the step for presenting the identified stylists for the consumer to review and select (at 425) when the preferred personal stylist is not reachable immediately.

II. Online Personal Style Advice and Sales System

To make the online personalized style advice and sales system of the present disclosure, the website may be developed and published in such a way that different stylists could be accessed and in such a way that the stylist will be able to review an individual's file and past activity on the account.

In some embodiments, the online personalized style advice and sales system includes a cloud-network server that hosts personalized style advice and sales cloud service on a web portal. In some embodiments, the online personalized style advice and sales system allows individuals to contact a personal stylist in order to find the perfect article of clothing that would match an article of clothing that the client already is in possession of or owns. In some embodiments, an individual would capture a digital self-image while wearing the article of clothing to match against. In some embodiments, an individual would complete a survey describing certain details and aspects of themselves. In some embodiments, the individual would transmit the digital self-image to the online personalized style advice and sales system. In some embodiments, the individual would complete the survey when connected to the personalized style advice and sales cloud service on the web portal. In some embodiments, the individual would transmit the survey along with the digital self-image to the online personalized style advice and sales system. In some embodiments, the online personalized style advice and sales system allows the individual to review profiles and background information about several stylists and select a stylist from among the several stylists. In some embodiments, the online personalized style advice and sales system sends the digital self-image and the survey to the stylist selected by the individual. In some embodiments, the online personalized style advice and sales system sends the digital self-image and the survey to a stylist selected by the system. In some embodiments, the stylist researches possible matching clothing articles based on the digital self-image and provides a set of clothing article options to the individual. In some embodiments, the online personalized style advice and sales system communicably connects the individual to the stylist. In some embodiments, the communication connection allows the individual to ask the stylist questions about the clothing article options and allows the stylist to explain the clothing article options to the individual. In some embodiments, the online personalized style advice and sales system allows the individual to make a purchase decision about the clothing article options. In some embodiments, the purchase decision comprises a selection of purchasing one or more of the clothing article options and declining to purchase any of the clothing article options.

By way of example, FIG. 5 conceptually illustrates an architecture of an online personalized style advice and sales system 500. As shown in this figure, the online personalized style advice and sales system 500 includes a plurality of consumer computing devices 510a-510b, a plurality of stylist computing devices 510c-510n, a set of personalized style advice and sales servers 520, a consumer membership database 530, a stylist database 540, online discounting vendor sites and data sources 550, and third party online vendor sites and data sources 560. The set of personalized style advice and sales servers 520 includes at least one personalized style advice and sales web service host computing device 528, which provides a hosted connection network address (e.g., an IP address, a web URL, etc.) to which the plurality of consumer computing devices 510a-510b and the plurality of stylist computing devices 510c-510n can connect to from any location at which a network connection can be established in order to access the personalized style advice and sales system 500. The set of personalized style advice and sales servers 520 may also include separate computing device servers, such as (i) an authentication server 526, which performs a set of authentication operations in relation to consumers or stylists trying to access the personalized style advice and sales system 500, (ii) a database management server 522 that interfaces with the consumer member database 530 to store and retrieve information related to consumer memberships and individual consumer history, and/or (iii) a consumer registration server 524 that registers each new consumer of the personalized style advice and sales system 500 (e.g., when a consumer registers).

Each of the consumer computing devices 510a-510b and stylist computing devices 510c-510n connects to the personalized style advice and sales servers 520 over a network (labeled "cloud" in the online personalized style advice and sales system 500 shown in this figure), such as the Internet, to send and receive data in relation to personal style advice and sales for consumers seeking recommendations from personal stylists. The consumer computing device 510a is a smartphone that is operated by a consumer and includes an onboard video capture device (camera) that is able to capture photos of the consumer to provide to personal stylists. The consumer computing device 510b is a tablet computing device that is also operated by a consumer and includes a tablet video capture device (tablet camera) configured to capture photos of the consumer to provide to personal stylists. In some embodiments, a personalized style advice and sales application runs on the consumer computing devices 510a-510b operated by the consumers to all the consumers to interact with the personalized style advice and sales system 500 to obtain personal style advice from a selected personal stylist. The personalized style advice and sales application running on the consumer computing devices 510a-510b each receive personalized style information from the consumer and capture one or more photos of the respective consumer and transmits the personalized style information and the consumer photos over the cloud to the personalized style advice and sales servers 520 for subsequent distribution to stylists. In some embodiments, when a network connection cannot be established, the personalized style information and photo(s) from each consumer is temporarily stored on the consumer computing devices 510a-510b until a network connection can be made to reach the personalized style advice and sales servers 520 for storage in the consumer membership database 520 by way of the database management server 522. For example, the personalized style advice and sales application running on the consumer computing device can upload the data later, when a network connection to the online personalized style advice and sales system 500 can be made.

In contrast to the consumer computing devices 510a-510b, each of the stylist computing devices 510c-510n receives data in relation to personalized style advice requests, information, and photos from consumers seeking style advice and recommendations of substitution garments to match with existing articles of clothing. Specifically, each of the stylist computing devices 510c-510n is operated by a personal stylist who is associated with the online personalized style advice and sales system 500. When personal style information and consumer photo(s) are provided to a particular personal stylist selected by the consumer, the particular personal stylist can evaluate the information and photo to identify matching articles of clothing to recommend to the consumer. The particular personal stylist attempts to identify the perfect matching article of clothing (or ensemble articles of clothing) based on a consumer-specified article of clothing noted in the consumer photo as the article of clothing on the consumer to replace with a recommended matching article of clothing. In some embodiments, the recommended matching articles of clothing are uploaded to the personalized style advice and sales servers 520 for storage in the consumer membership database 530 and for re-transmission to the corresponding consumer computing device of the consumer for review and possible selection to purchase.

In some embodiments, the personalized style advice and sales servers 520 can scale to accommodate multiple simultaneous consumer computing device and stylist computing device connections. In some embodiments, the personalized style advice and sales web service host computing device 528 along with the authentication server 526 provide a login interface so that a consumer user of the consumer computing device or a stylist user of a stylist computing device can access the online personalized style advice and sales system 500 through an existing registered account. In some embodiments, registered consumer accounts are stored in the consumer membership database 530 and registered stylist accounts are stored in the stylist database 540. In addition, in some embodiments, the personalized style advice and sales web service host computing device 528 along with the authentication server 526 performs authentication operations in relation to login attempts received from the consumer computing devices 510a-510b or the stylist computing devices 510c-510n. In some embodiments, one or both of the login interface and the authentication operations are provided by or performed independently on the consumer computing device or the stylist computing device by the personalized style advice and sales application running.

In some embodiments, consumers of the consumer computing devices 510a-510b can purchase a recommended article of clothing through the corresponding personal stylist who recommended the clothing article. In some embodiments, a selection by a consumer of a purchase button (such as the online purchase button 190 described above by reference to FIG. 1) that is associated with a particular recommended article of clothing triggers a connection to a particular online discounting vendor who offers the particular recommended article of clothing for sale. In some embodiments, the particular online discounting vendor is one of many online discounting vendors accessed through online discounting vendor sites and data sources 550. In some embodiments, a consumer can purchase a particular recommended article of clothing which is not associated with an online discounting vendor, but is still connected through the online personalized style advice and sales system 500 to a particular third party online vendor. In some embodiments, the particular third party online vendor is one of many third party online vendors accessed through third party online vendor sites and data sources 560. Also, in some embodiments, the online personalized style advice and sales system 500 is associated with third party online vendors who provide their own independent special offers or promotions to individuals who select their products or services.

In some embodiments, the online personalized style advice and sales system can be adapted for use in make-up styling and/or hair styling. For instance, the online personalized style advice and sales system may include services for make-up matching to a person's complexion, or services for hair style/hair color matching based on hair type and/or complexion of the person. Thus, by offering make-up and hair suggestions, either individually as separate systems or in combination with the online personalized style advice and sales system, one would be able to obtain a full slate of essential stylist services. When the features are combined in a single online personalized style advice and sales system, for example, the user would be able to tap into features that provide choices for make-up that would match well with certain outfits, which may also be based on the outfit choices contemporaneously being offered by the personal stylist.

Similarly, hair styles or hair colors could be provided as recommended choices to go along with an outfit or a make-up selection. In such systems, links to hair stylists could provide convenient scheduling of appointments at locations capable of meeting the user's needs. All of the advice would be personalized to the individual, and would give the individual final authority regarding buying decisions. Furthermore, in some situations, if a user became very comfortable with a particular stylist, then they may even suggest whole outfits for specific occasions.

In some embodiments, a registered consumer can save membership account settings to quickly access the online personalized style advice and sales system to obtain personal stylist advice. In some embodiments, the membership account settings include a preferred personal stylist which the registered consumer can set to any particular personal stylist of their choice. In this way, the steps for registering for a membership and selecting a personal stylist can be skipped for previously registered consumers who have set the preferred personal stylist in their membership account settings. In some embodiments, when a preferred personal stylist is set in the membership account settings of a previously registered consumer, an option is provided for the consumer to engage in an immediate consultation with the preferred personal stylist. In some embodiments, the immediate consultation with the preferred personal stylist comprises one or both of an on-the-spot video chat conference and an immediate text messaging conference. For instance, if a previously registered consumer with a preferred personal stylist happens to be out shopping and finds a desired article of clothing, the consumer may engage in an immediate consultation with the preferred personal stylist to obtain style advice on what to match with the desired article of clothing or even a critique of the desired article of clothing itself. In some embodiments, a previously registered consumer may also engage in an immediate consultation when the preferred personal stylist cannot be reached or cannot communicate at the present moment. In some embodiments, the option to engage in the immediate consultation then presents several stylists for the consumer to choose from to engage in the immediate style advice consultation.

The above-described embodiments of the invention are presented for purposes of illustration and not of limitation.

III. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images generated by the electronic system 600. The output devices 635 include printers and display devices, such as cathode ray tubes (CRT) or liquid crystal displays (LCD). Some embodiments include a touchscreen that functions as both an input and output device.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 2-4 conceptually illustrate processes in which the specific operations of these processes may not be performed in the exact order shown and described. Specific operations may not be performed in one continuous series of operations, and different specific operations may be performed in different embodiments. Furthermore, the processes could be implemented using several sub-processes, or as part of a larger macro process. Thus, one of ordinary skill in the art would understand that the invention is not to be limited by the foregoing illustrative details, but rather is to be defined by the appended claims.

I claim:

1. An online personalized style advice and sales system that allows consumers to contact personal stylists in order to find articles of clothing that match existing articles of clothing, the online personalized style advice and sales system comprising:
  a cloud-based server computing device comprising a processor, a memory unit, a permanent storage device, and website portal software that provides a personalized style advice and sales service in which a registered consumer can reach a personal stylist to assist in matching a personal clothing item with another clothing item to make a complete matching outfit;
  an authentication server that performs authentication of existing registered accounts by way of consumer login credentials associated with the existing registered consumer accounts and entered into a login interface for verification of consumer computing devices attempting to access the personalized style advice and sales service;
  a consumer membership database system that stores consumer membership information for registered consumer members who access the cloud-based server computing device to use the personalized style advice and sales service, wherein the consumer membership database system stores a registered consumer account recognized by the associated consumer login credentials entered into the login interface for each registered consumer member, wherein the consumer membership database system stores a particular registered stylist account as a preferred personal stylist for any consumer who sets a particular personal stylist associated with the particular registered stylist account as preferred, wherein the consumer membership database system stores personalized style information for any consumer who completes a personal style survey;
  a consumer camera device that is configured to capture photos of a consumer to provide to personal stylists;
  a consumer computing device associated with the registered consumer who intends to use the personalized style advice and sales service to obtain style advice from a personal stylist, wherein the consumer computing device connects to the authentication server to access the login interface for the registered consumer to input consumer login credentials for authentication of the registered consumer by the authentication server, wherein after successful login and upon verified authentication of the registered consumer, the consumer computing device securely connects to the cloud-based server computing device over the internet to access the personalized style advice and sales service for personal style advice from a personal stylist comprising one of the particular personal stylist associated with the particular registered stylist account stored in the consumer membership database and a presently available personal stylist selected by the registered consumer from a list of available stylists that are identified by the personalized style advice and sales service based on the personalized style information of the registered consumer stored in the consumer membership database system, wherein an exclusive consultation session is started between the registered consumer and the particular personal stylist by default when the particular personal stylist is available, wherein the exclusive consultation session is started between the registered consumer and the presently available personal stylist upon selection of the presently available personal stylist when the particular personal stylist is not available, wherein the consumer computing device securely uploads a photo captured by the consumer camera device after starting the exclusive consultation session, wherein the captured photo includes a digital image of the registered consumer wearing the personal clothing item to match and a different personal clothing item to replace with another clothing item to make a complete matching outfit with the personal clothing item to match;
  a stylist database system that stores registered stylist accounts associated with personal stylists who operate stylist computing devices to connect to the cloud-based server computing device to provide personalized style advice to registered consumers accessing the cloud-based server computing device to use the personalized style advice and sales service, wherein profile and background information for each registered stylist account associated with a personal stylist are reviewable by the registered consumer at the consumer computing device; and a particular stylist computing device that is associated with a particular personal stylist and is connected in the exclusive consultation session to the consumer computing device associated with the registered consumer to engage in the exclusive consultation session with the particular personal stylist, wherein the particular personal stylist securely provides a set of clothing article style choices during the exclusive consultation session to the registered consumer based on the securely uploaded photo, wherein a style choice selection of a particular clothing article by the registered consumer followed by a selection of an online purchase button by the registered consumer triggers a connection to a particular online discounting vendor offering the particular clothing article for sale and prompts a purchase transaction from the particular online discounting vendor for the particular clothing article, wherein the purchase transaction is completed by the particular personal stylist on behalf of the registered consumer.

2. The online personalized style advice and sales system of claim 1, wherein the consumer computing device associated with the registered consumer is one computing device in a plurality of consumer computing devices associated with a plurality of consumers who intend to use the personalized style advice and sales service to obtain style advice from personal stylists.

3. The online personalized style advice and sales system of claim 2, wherein at least one consumer computing device in the plurality of consumer computing devices is associated with an unregistered consumer.

4. The online personalized style advice and sales system of claim 3 further comprising a consumer registration server computing device that presents a consumer registration and membership web page to non-registered consumers, wherein the personalized style advice and sales service presents the consumer registration and membership web page to the unregistered consumer when the consumer computing device used by the unregistered consumer accesses the personalized style advice and sales service.

5. The online personalized style advice and sales system of claim 4, wherein the unregistered consumer inputs registration information into the consumer registration and membership web page to register for use of the personalized style advice and sales service.

6. The online personalized style advice and sales system of claim 5, wherein the registration information input of the unregistered consumer is stored in a new member account data structure that is saved in the consumer membership database system.

7. The online personalized style advice and sales system of claim 1, wherein the consumer computing device securely uploads a second photo captured by the consumer camera device, the second photo comprising a digital self-image of the registered consumer in a body form-fitting outfit.

8. The online personalized style advice and sales system of claim 7, wherein the consumer computing device securely uploads a third photo retrieved from at least one of (i) a web site of an online vendor associated with a particular commercial vendor with a physical retail store at which the registered consumer is presently located and (ii) a storage device that is communicably connected to the consumer computing device, the third photo comprising a specific clothing item digital image of a specific article of clothing by itself.

9. The online personalized style advice and sales system of claim 1, wherein the exclusive consultation session comprises an immediate text messaging conference with one of the particular personal stylist and the presently available personal stylist.

10. The online personalized style advice and sales system of claim 1, wherein the consumer camera device comprises a video camera that is configured to capture and stream live video during the exclusive consultation session with one of the presently available personal stylist and the particular personal stylist.

11. The online personalized style advice and sales system of claim 10, wherein the exclusive consultation session comprises at least one of an on-the-spot video chat conference and an immediate text messaging conference.

* * * * *